(12) United States Patent
Yu et al.

(10) Patent No.: US 8,840,817 B2
(45) Date of Patent: Sep. 23, 2014

(54) PREPARATION METHOD FOR ASPHALT-BASED SPHERICAL ACTIVATED CARBON WHICH REQUIRES NO INFUSIBILIZATION PROCESS

(75) Inventors: Xiangmin Yu, Shaanxi (CN); Yizhou Kong, Shaanxi (CN)

(73) Assignees: Yizhou Kong, Shaanxi; Xiangmin Yu, Shaanxi; Jinsheng Shi, Shaanxi; Shenzhen BaTian Ecotypic Engineering Co., Ltd., Guangdong ( * ) Notice: Subject to any disclaimer, the term of this patent is extended or adjusted under 35 U.S.C. 154(b) by 145 days.

(21) Appl. No.: 13/695,052

(22) PCT Filed: Feb. 20, 2012

(86) PCT No.: PCT/CN2012/000200
§ 371 (c)(1),
(2), (4) Date: Oct. 29, 2012

(87) PCT Pub. No.: WO2012/146048
PCT Pub. Date: Nov. 1, 2012

(65) Prior Publication Data
US 2013/0241094 A1 Sep. 19, 2013

(30) Foreign Application Priority Data
Apr. 28, 2011 (CN) .......................... 2011 1 0108729

(51) Int. Cl.
*C01B 31/08* (2006.01)
*B01J 20/30* (2006.01)
*B01J 20/20* (2006.01)

(52) U.S. Cl.
CPC ............... *C01B 31/089* (2013.01); *B01J 20/30* (2013.01); *B01J 20/20* (2013.01)

USPC ............ 264/29.3; 264/29.1; 502/9; 502/418; 502/432

(58) Field of Classification Search
None
See application file for complete search history.

(56) References Cited

U.S. PATENT DOCUMENTS

| | | | |
|---|---|---|---|
| 4,268,417 A * | 5/1981 | Messer .......................... 502/430 |
| 4,273,675 A * | 6/1981 | Shiiki et al. ....................... 502/9 |
| 4,371,454 A | 2/1983 | Hisatsugu et al. |
| 7,781,370 B2 * | 8/2010 | Sonobe et al. ................. 502/418 |
| 2003/0020198 A1 * | 1/2003 | McCrae et al. ................ 264/122 |
| 2009/0158927 A1 * | 6/2009 | Schonfeld et al. ................ 95/90 |
| 2010/0113267 A1 * | 5/2010 | Srinivasachar et al. ........ 502/421 |

* cited by examiner

Primary Examiner — Mary F Theisen

(57) ABSTRACT

The present invention is a preparation method for asphalt-based spherical activated carbon which requires no infusibilization process. Placing coal tar asphalt into a melting device; introducing compressed air of 0.1 MPa-0.5 MPa into the device and stirring until a melting temperature of 280° C.-350° C. is reached; continuing for 2-8 hours until the base material has a softening point of 200° C.-260° C.; after cooling down, pulverizing the base material to obtain asphalt powder. Obtaining 34%-79% by mass of carbon powder, 1%-10% by mass of binder, and 20%-65% by mass of the asphalt powder and then forming spherical particles with a diameter of 0.5 mm-5 mm with the carbon powder, the binder and the asphalt powder at room temperature. Introducing the spherical particles of asphalt directly into an asphalt carbonization furnace for carbonization at a temperature of 600° C.-900° C. under protection of an inert gas to obtain asphalt spherical carbon. Asphalt spherical carbon is subject to activation treatment to obtain asphalt spherical activated carbon. The preparation method of the present invention reduces processing difficulty and production costs significantly.

4 Claims, 1 Drawing Sheet

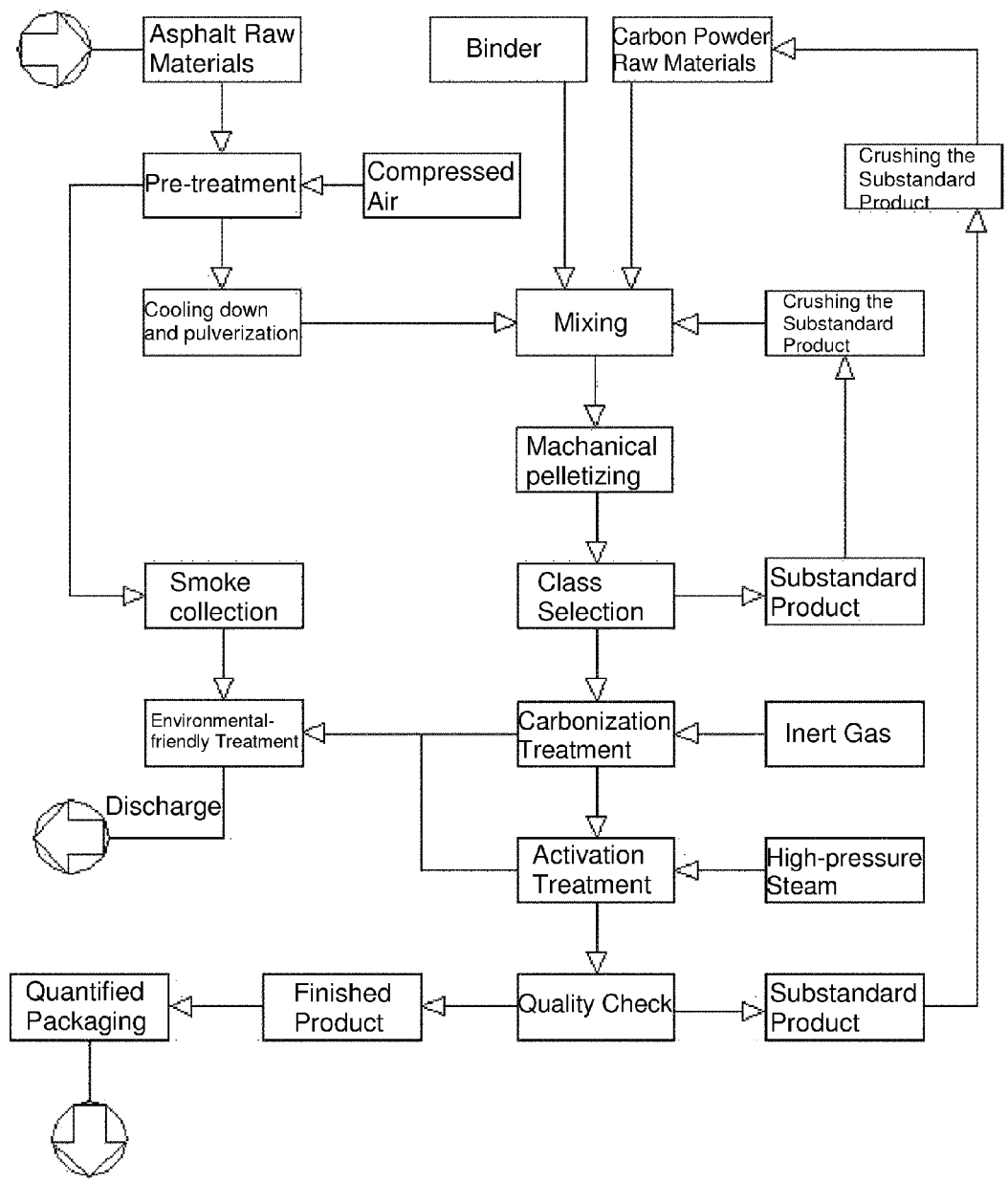

PREPARATION METHOD FOR ASPHALT-BASED SPHERICAL ACTIVATED CARBON WHICH REQUIRES NO INFUSIBILIZATION PROCESS

BACKGROUND OF THE INVENTION

The present invention relates to the preparation of activated carbon and specifically pertains to a preparation method for asphalt-based spherical activated carbon which requires no infusibilization process.

Asphalt-based spherical activated carbon has many advantages which include good sphericity, high mechanical strength, fixed bed capacity with low resistance, strong wide-spectrum adsorption, high absorption and desorption rate and regenerability. It is widely used in environmental protection, medical, chemical and military fields. It is a high-end variety in the family of activated carbon, but its high technical cost is a major obstacle to industrial production, promotion and application.

The present production of asphalt-based spherical activated carbon, as represented by Kureha Chemical Industry Co., Ltd. of Japan, must go through five steps: 1. preparing modified asphalt raw materials; 2. shaping asphalt particles into spheres; 3. undergoing infusibilization process (including chemical impregnation); 4. carbonizing asphalt spherical particles; 5. activating asphalt spherical carbon. To prevent the spherical particles from melting during high-temperature carbonization, the asphalt spherical particles must undergo infusibilization before carbonization. This is called the infusibilization process in the industry.

The existing asphalt-based spherical activated carbon treatment process is highly related to the fact that the spherical particles are in the molten state during the shaping process. No matter the shaping process is done by suspension, emulsification, pyrocondensation polymerization or other methods, asphalt particles automatically shrink into spheres in a non-mutually exclusive liquid phase (or gas phase) medium by means of their own surface tension when they are in the molten state. The spherical asphalt particles prepared by such process must undergo the infusibilization process before entering the high-temperature carbonization stage.

The infusibilization process is the most difficult technical aspect of the entire process and because of this its processing cost is often more than half of the total cost. The infusibilization process raises technical difficulty of processing asphalt-based spherical activated carbon sharply, thereby significantly increasing the cost of production.

BRIEF SUMMARY OF THE INVENTION

The object of the present invention is to provide a preparation method for asphalt-based spherical activated carbon which requires no infusibilization process, thereby reducing the difficulty of processing as well as the cost of production.

To attain this, the present invention provides a preparation method for asphalt-based spherical activated carbon which requires no infusibilization process which is specifically carried out in accordance with the following steps:

Step 1: Preparing Asphalt Powder

Selecting coal tar asphalt as a base material and placing it into a melting device; introducing compressed air of 0.1 MPa-0.5 MPa into the device and stirring the base material until a melting temperature of 280° C.-350° C. is reached; continuing for 2-8 hours until the base material has a softening point of 200° C.-260° C.; after cooling down, pulverizing the base material to obtain asphalt powder.

Step 2: Shaping Asphalt Particles into Spheres

Obtaining 34%-79% by mass of carbon powder, 1%-10% by mass of binder, and 20%-65% by mass of the asphalt powder obtained in Step 1 wherein mass percentage of the carbon powder, the binder and the asphalt powder sums up to 100%; and then forming spherical particles with a diameter of 0.5 mm-5 mm by subjecting the obtained carbon powder, binder and asphalt powder into a pelletizer at room temperature to obtain spherical particles of asphalt.

Step 3: Carbonizing Spherical Particles of Asphalt

Introducing the spherical particles of asphalt obtained in Step 2 directly into an asphalt carbonization furnace for carbonization at a temperature of 600° C.-900° C. under protection of an inert gas to obtain asphalt spherical carbon.

Step 4: Activating Asphalt Spherical Carbon

Subjecting the asphalt spherical carbon obtained in Step 3 to activation treatment to obtain asphalt-based spherical activated carbon.

The present invention is also characterized in that:

The binder is selected from carboxymethyl cellulose, hydroxypropyl methylcellulose or a combination of carboxymethyl cellulose and hydroxypropyl methylcellulose; the combination may be in any content ratio.

The carbon powder is one or a combination of more than one kind of powder material formed by carbon or activated carbon produced from crushed asphalt coke, petroleum coke, coal tar, coal or plants which can be carbonized without any phase change at 800° C. or less; the combination may be in any content ratio.

The specific process of the activation treatment of spherical carbon is to activate the asphalt spherical carbon using high-temperature steam in an activation device.

The beneficial effect of the present invention is to eliminate the infusibilization process required in existing preparation methods. The present invention mixes asphalt powder, carbon powder and binder according to an appropriate ratio, and thereafter shapes the asphalt powder into spheres at room temperature by conventional mechanical processing methods; it then directly undergoes carbonization and activation procedures. Compared with the traditional method, the present invention is simple and effective, and also it eliminates the need for infusibilization which is highly energy-consuming and expensive.

BRIEF DESCRIPTION OF THE DRAWINGS

FIG. 1 is the process flow diagram of the preparation method of the present invention for asphalt-based spherical activated carbon.

DETAILED DESCRIPTION OF THE INVENTION

The present invention will be explained in details below with reference to the accompanying drawing and specific embodiments:

The flow of the preparation method of the present invention for asphalt-based spherical activated carbon which requires no infusibilization process is as follows. In summary, as shown in FIG. 1, the preparation method includes the following four steps: Step 1: Pre-treating asphalt; Step 2: Shaping asphalt particles into spheres; Step 3: Carbonization of spherical asphalt particles; Step 4: Activation of asphalt spherical carbon.

The specific procedures of the preparation method of the present invention for asphalt-based spherical activated carbon which requires no infusibilization process are as follows:

Step 1: Pre-treating Asphalt, Namely Preparing Asphalt Powder with High Softening Point:

Selecting coal tar asphalt as a base material and place it into a melting device. Introducing compressed air of 0.1 MPa-0.5 MPa into the device and stirring the base material until a melting temperature of 280° C.-350° C. is reached; continuing for 2-8 hours until the base material has a softening point of 200° C.-260° C.; after cooling down, pulverizing the base material to obtain asphalt powder.

Asphalt itself contains a large amount of light components. The light components mainly refer to bitumen aromatic compound, polycyclic aromatic hydrocarbons and so forth, such as benzene, toluene, xylene, trimethylbenzene, naphthalene, methylnaphthalene, biphenyl, indene, acenaphthylene, anthracene, carbazole and dozens of other substances. During the pretreatment of asphalt, a majority of the light components will be volatilized together with the air flowing into the molten asphalt while undergoing continuous stirring. The step poses a significant impact to the quality of the finished product and the security of the furnace for high temperature carbonization for the next step. This is because excess light components volatilized during high-temperature carbonization results in the formation of many irregular holes of different diameters in the spheres. This is bound to affect the shape and intensity of the spheres. In addition, the light components are mostly inflammable and explosive substances. If the quantity of light components is accumulated to a certain degree in the enclosed high-temperature carbonization furnace, it will be unsafe. Based on the two points mentioned above, the pretreatment of asphalt is essential.

Step 2: Shaping Asphalt Particles into Spheres

Obtaining 34%-79% by mass of carbon powder, 1%-10% by mass of binder, and 20%-65% by mass of asphalt powder obtained in Step 1 wherein mass percentage of the carbon powder, the binder and the asphalt powder sums up to 100%. The binder is selected from carboxymethyl cellulose (CMC), hydroxypropyl methylcellulose (HPMC) or a combination of carboxymethyl cellulose and hydroxypropyl methylcellulose; the combination may be in any content ratio. The carbon powder is one or a combination of more than one kind of powder material formed by carbon or activated carbon produced from crushed asphalt coke, petroleum coke, coal tar, coal or plants which can be carbonized without any phase change at 800° C. or less; the combination may be in any content ratio. Then subjecting the carbon powder, the binder and the asphalt powder into a pelletizer at room temperature to obtain spherical particles of asphalt with a diameter of 0.5 mm-5 mm;

Step 3: Carbonizing Spherical Particles of Asphalt

Introducing the spherical particles of asphalt obtained in Step 2 directly into a conventional asphalt carbonization furnace for carbonization at a temperature of 600° C.-900° C. under protection of an inert gas to obtain asphalt spherical carbon.

Step 4: Activating asphalt spherical carbon

Use conventional activation device and method to complete the spherical carbon activation treatment, for example, by using high temperature steam to activate.

In the present invention, asphalt which has excellent and irreplaceable high-temperature adhesive properties, and carbon powder which has a porous structure with high specific surface area and excellent adsorptive performance are utilized. After the pretreatment of asphalt, these two powder materials together with a binder are processed to form spherical particles of a given size using pelletizing technique. The obtained spherical particles are placed in the high-temperature carbonization furnace to undergo the process of carbonization. During the process, when temperature is increased, asphalt in the composition of the spherical particles is bound to melt and undergo a series of chemical condensation polymerization. Condensation polymerization will inevitably lead to a change in geometrical shape of the spherical particles. At this moment, carbon powder in the composition of the spherical particles will play two very important functions. The first function is spherical skeleton function: In the pelletizing process, the carbon powder and asphalt powder in the spherical particles bind with each other uniformly to form a dense sphere with the help of the binder. Asphalt in the spheres will inevitably change from solid phase to liquid phase as temperature increases. However, carbon powder in the spheres will not change its phase as temperature increases. In this way, carbon powder in the spheres will naturally form a spherical grid skeleton. The spherical skeleton provides passage for volatile gas in the spheres and accommodating space for molten asphalt to expand under high temperature. It can effectively prevent deformation and fissures caused by asphalt polycondensation reaction under high temperature, avoiding stress concentration. The second important function lies in porous structure with high specific surface area and excellent adsorption properties of the carbon powder. The absorption properties of the porous structure allow the complete absorption of the molten liquid substance of asphalt by the solid phase carbon powder timely. This effectively avoids the situation in which the molten liquid asphalt overflows from the spheres under high temperature, causing melting and binding to occur between particles. Further heating will inevitably turn asphalt in the spheres from liquid phase to solid phase until it is completely carbonized. At this moment, high temperature adhesive properties of asphalt can bind the carbon powder within the spheres cohesively together for carbonization into spherical carbon with a geometrical shape and strength that meet requirements. Spherical carbon is then activated again and this marks the completion of the whole process of the treatment for the asphalt-based spherical activated carbon which requires no infusibilization process.

Processing powder materials into spheres, carbonization of spherical asphalt and activation of spherical spheres are existing technologies.

The preparation method of the present invention for asphalt-based spherical activated carbon which requires no infusibilization process has the following advantages:

1. Processed asphalt powder, carbon powder and binder in a specific proportion are mechanically processed under room temperature to form spherical particles with specific diameters. This provides passage for volatile gas in the spheres and accommodating space for expansion of molten asphalt under high temperature, thus avoiding melting and binding to occur between particles as the molten asphalt congregates and flows. It acts as the basis of the elimination of the infusibilization process, and at the same time reserves passage for the diffusion of gas inside the spheres during activation. This facilitates the shortening of the time for activation reaction.

2. The internal structure of the spherical particles produced by mechanical processing is much different from spheres produced by traditional melting method; therefore it can effectively prevent the deformation and fissures caused by asphalt polycondensation reaction under high temperature, avoiding stress concentration. Its spherical shape and strength in fatigue resistance can fully meet the requirements.

3. Asphalt spheres do not undergo the traditional processes such as solvent extraction or vacuum removal of additives, and they can meet the requirements on the mechanical strength of the spheres.

4. The present invention overcomes the bottleneck of traditional infusibilization processing which brings about tremendous energy consumption, high production costs and low scale of production which are unfavourable to large scale industrial production.

5. Owing to the sharp decrease in production costs, its application area can be widely extended.

Embodiment 1

Select coal tar asphalt as a base material. Place it into a melting device. Introduce compressed air of 0.1 Mpa into the device and stir the base material until a melting temperature of 280° C. is reached. Continue for 8 hours until the base material has a softening point of 260° C. After cooling down, pulverize the base material to obtain asphalt powder. Obtain 34% by mass of carbon powder, 1% by mass of carboxymethyl cellulose, and 65% by mass of asphalt powder obtained previously. Form spherical particles with a diameter of 0.5 mm-5 mm by subjecting the carbon powder, the carboxymethyl cellulose and the asphalt powder into a pelletizer at room temperature. Introduce the spherical particles obtained previously directly into an asphalt carbonization furnace for carbonization at a temperature of 600° C. under protection of nitrogen to obtain spherical carbon. Subject the spherical carbon to activation treatment under high temperature steam to obtain asphalt-based spherical activated carbon.

Embodiment 2

Select coal tar asphalt as a base material. Place it into a melting device. Introduce compressed air of 0.5 MPa into the device and stir the base material until a melting temperature of 300° C. is reached. Continue for 2 hours until the base material has a softening point of 200° C. After cooling down, pulverize the base material to obtain asphalt powder. Obtain 79% by mass of carbon powder, 1% by mass of hydroxypropyl methylcellulose, and 20% by mass of asphalt powder obtained previously. Form spherical particles with a diameter of 0.5 mm-5 mm by subjecting the carbon powder, the hydroxypropyl methylcellulose and the asphalt powder into a pelletizer at room temperature. Introduce the spherical particles obtained previously directly into an asphalt carbonization furnace for carbonization at a temperature of 900° C. under protection of nitrogen to obtain spherical carbon. Subject the spherical carbon to activation treatment under high temperature steam to obtain asphalt-based spherical activated carbon.

Embodiment 3

Select coal tar asphalt as a base material. Place it into a melting device. Introduce compressed air of 0.3 MPa into the device and stir the base material until a melting temperature of 290° C. is reached. Continue for 5 hours until the base material has a softening point of 230° C. After cooling down, pulverize the base material to obtain asphalt powder. Obtain 60% by mass of carbon powder, 10% by mass of binder and 30% by mass of asphalt powder obtained previously. In particular, the binder is the combination of carboxymethyl cellulose and hydroxypropyl methylcellulose. Form spherical particles with a diameter of 0.5 mm-5 mm by subjecting the carbon powder, the binder and the asphalt powder into a pelletizer at room temperature. Introduce the spherical particles obtained previously directly into an asphalt carbonization furnace for carbonization at a temperature of 750° C. under protection of nitrogen to obtain spherical carbon. Subject the spherical carbon to activation treatment under high temperature steam to obtain asphalt-based spherical activated carbon.

Embodiment 4

Select coal tar asphalt as a base material. Place it into a melting device. Introduce compressed air of 0.4 MPa into the device and stir the base material until a melting temperature of 285° C. is reached. Continue for 6 hours until the base material has a softening point of 240° C. After cooling down, pulverize the base material to obtain asphalt powder. Obtain 70% by mass of carbon powder, 5% by mass of hydroxypropyl methylcellulose, and 25% by mass of asphalt powder obtained previously. Form spherical particles with a diameter of 0.5 mm-5 mm by subjecting the carbon powder, the hydroxypropyl methylcellulose and the asphalt powder into a pelletizer at room temperature. Introduce the spherical particles obtained previously directly into an asphalt carbonization furnace for carbonization at a temperature of 700° C. under protection of nitrogen to obtain spherical carbon. Subject the spherical carbon to activation treatment under high temperature steam to obtain asphalt-based spherical activated carbon.

What is claimed is:

1. A preparation method for asphalt-based spherical activated carbon which requires no infusibilization process, characterized in that it is specifically carried out in accordance with the following steps:

Step 1: Preparing asphalt powder

Selecting coal tar asphalt as a base material and placing it into a melting device;

introducing compressed air of 0.1 MPa-0.5 MPa into the device and stirring the base material until a melting temperature of 280° C.-350° C. is reached; continuing for 2-8 hours until the base material has a softening point of 200° C.-260° C.; after cooling down, pulverizing the base material to obtain asphalt powder;

Step 2: Shaping asphalt particles into spheres

Obtaining 34%-79% by mass of carbon powder, 1%-10% by mass of binder, and 20%-65% by mass of the asphalt powder obtained in Step 1 wherein mass percentage of the carbon powder, the binder and the asphalt powder sums up to 100%; and then forming spherical particles with a diameter of 0.5 mm-5 mm by subjecting the carbon powder, the binder and the asphalt powder into a pelletizer at room temperature to obtain spherical particles of asphalt;

Step 3: Carbonizing spherical particles of asphalt

Introducing the spherical particles of asphalt obtained in Step 2 directly into an asphalt carbonization furnace for carbonization at a temperature of 600° C.-900° C. under protection of an inert gas to obtain asphalt spherical carbon;

Step 4: Activating asphalt spherical carbon

Subjecting asphalt spherical carbon obtained in Step 3 to activation treatment to obtain asphalt spherical activated carbon.

2. The preparation method for asphalt-based spherical activated carbon which requires no infusibilization process as in claim 1, characterized in that the binder is selected from carboxymethyl cellulose, hydroxypropyl methylcellulose or a combination of carboxymethyl cellulose and hydroxypropyl methylcellulose is used; the combination may be in any content ratio.

3. The preparation method for asphalt-based spherical activated carbon which requires no infusibilization process as in claim 1, characterized in that the carbon powder is one or a combination of more than one kind of powder material formed by carbon or activated carbon produced from crushed asphalt coke, petroleum coke, coal tar, coal or plants which can be carbonized without any phase change at 800° C. or less; and the combination may be in any content ratio.

4. The preparation method for asphalt-based spherical activated carbon which requires no infusibilization process as in claim 1, 2 or 3, characterized in that the asphalt spherical carbon is activated in an activation device using high temperature steam.

\* \* \* \* \*